(12) United States Patent
Bech

(10) Patent No.: US 11,920,556 B2
(45) Date of Patent: Mar. 5, 2024

(54) WIND TURBINE BLADE

(71) Applicant: Vestas Wind Systems A/S, Aarhus N. (DK)

(72) Inventor: Anton Bech, Ciudad Real (ES)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 17/311,806

(22) PCT Filed: Dec. 12, 2019

(86) PCT No.: PCT/DK2019/050388
§ 371 (c)(1),
(2) Date: Jun. 8, 2021

(87) PCT Pub. No.: WO2020/119874
PCT Pub. Date: Jun. 18, 2020

(65) Prior Publication Data
US 2022/0112875 A1 Apr. 14, 2022

(30) Foreign Application Priority Data
Dec. 14, 2018 (DK) .......................... PA 2018 70816

(51) Int. Cl.
*F03D 1/06* (2006.01)
(52) U.S. Cl.
CPC ...... *F03D 1/0675* (2013.01); *F05B 2240/302* (2013.01); *F05B 2260/30* (2013.01)
(58) Field of Classification Search
CPC ............. F05B 2240/302; F01D 1/0633; F01D 1/0641; F01D 1/0675; F01D 1/0683;
(Continued)

(56) References Cited

U.S. PATENT DOCUMENTS 7,922,454 B1 * 4/2011 Riddell ................ F03D 1/0675
416/224
8,449,259 B1 5/2013 Kaser
(Continued)

FOREIGN PATENT DOCUMENTS

CN 102454539 A 5/2012
CN 108691728 A 10/2018
(Continued)

OTHER PUBLICATIONS

Danish Patent and Trademark Office, Search and Examination Report in PA 2018 70816, dated Jun. 19, 2019.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

A wind turbine blade includes a first blade portion and a second blade portion coupled together by a connection joint. A first spar cap is associated with an upper shell half and a second spar cap is associated with the lower shell half of each of the first and second blade portions. A shear web extends between the first spar cap and the second spar cap of each of the first and second blade portions. The shear web is terminated away from a joint interface at which the first and second blade portions meet, and there is no shear web extending in a longitudinal direction across the joint interface. The shear web extending between the first spar cap and the second spar cap is branched in the longitudinal direction toward the first and second blade interfaces of the first and second blade portions respectively.

19 Claims, 7 Drawing Sheets

(58) Field of Classification Search
CPC .... F03D 1/0633; F03D 1/0641; F03D 1/0675; F03D 1/0683
See application file for complete search history.

(56) References Cited

U.S. PATENT DOCUMENTS

| | | | | |
|---|---|---|---|---|
| 10,830,207 | B2* | 11/2020 | Merzhaeuser | ........ F03D 1/0675 |
| 2010/0122442 | A1* | 5/2010 | Kirkpatrick | ............ B23P 15/04 |
| | | | | 29/233 |
| 2011/0158788 | A1* | 6/2011 | Bech | ...................... F03D 1/0683 |
| | | | | 29/889.7 |
| 2012/0100002 | A1 | 4/2012 | Kawasetsu et al. | |
| 2013/0224032 | A1* | 8/2013 | Busbey | ................. F03D 1/0675 |
| | | | | 416/223 R |
| 2015/0240780 | A1 | 8/2015 | Leonard et al. | |
| 2016/0169195 | A1* | 6/2016 | Johnson | ................ F03D 1/0658 |
| | | | | 29/889.71 |
| 2017/0022969 | A1* | 1/2017 | Hoffmann | ............. F03D 1/0675 |
| 2018/0223796 | A1 | 8/2018 | Yarbrough et al. | |
| 2018/0298879 | A1 | 10/2018 | Johnson et al. | |
| 2020/0072189 | A1* | 3/2020 | Merzhaeuser | .......... F03D 80/30 |
| 2021/0115893 | A1* | 4/2021 | Rinck | .................... F03D 1/0675 |
| 2021/0270232 | A1* | 9/2021 | Hoffmann | ............. F03D 1/0675 |
| 2021/0277874 | A1* | 9/2021 | Bech | ....................... F03D 13/35 |

FOREIGN PATENT DOCUMENTS

| | | |
|---|---|---|
| EP | 2935875 A1 | 10/2015 |
| WO | 2013084275 A1 | 6/2013 |
| WO | 2016189092 A1 | 12/2016 |
| WO | 2018121826 A1 | 7/2018 |

OTHER PUBLICATIONS

European Patent Office, International Search Report and Written Opinion in PCT Application No. PCT/DK2019/050388, dated Mar. 11, 2020.
Intellectual Property India, Examination Report issued in Indian Application No. 202117031433, dated Nov. 10, 2022.
European Patent Office, Examination Report in EP Application No. 19823772.9, dated Sep. 8, 2022.
China National Intellectual Property Administration, office action issued in corresponding Chinese patent application No. 201980091328. X. dated Apr. 22, 2023, with English translation.
China National Intellectual Property Adminstration, office action issued in corresponding CN Application No. 201980091328.X, with English translation, dated Sep. 19, 2023.

* cited by examiner

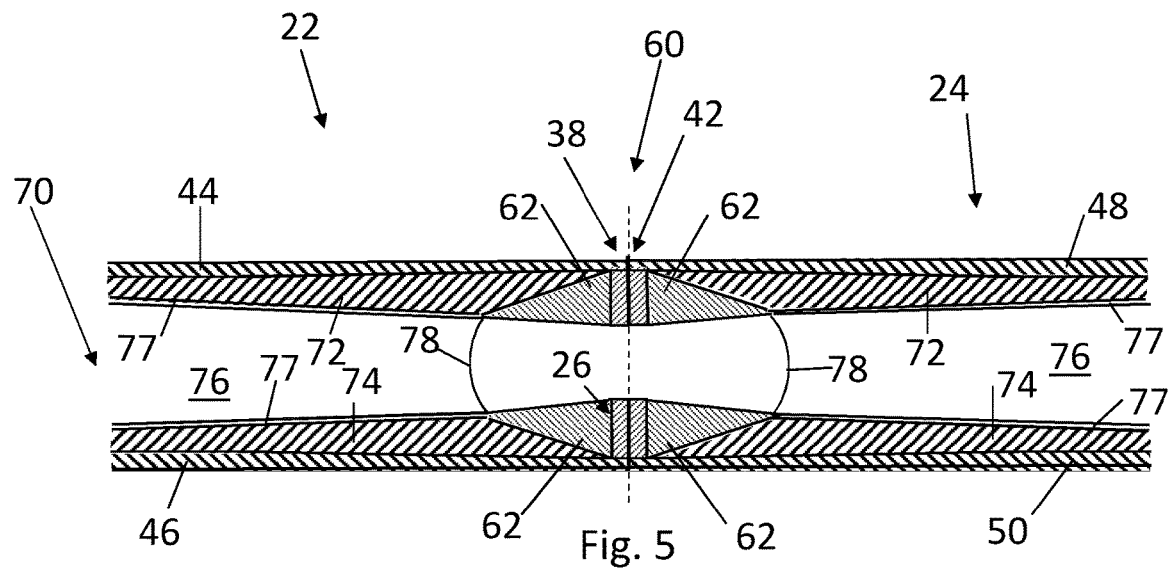
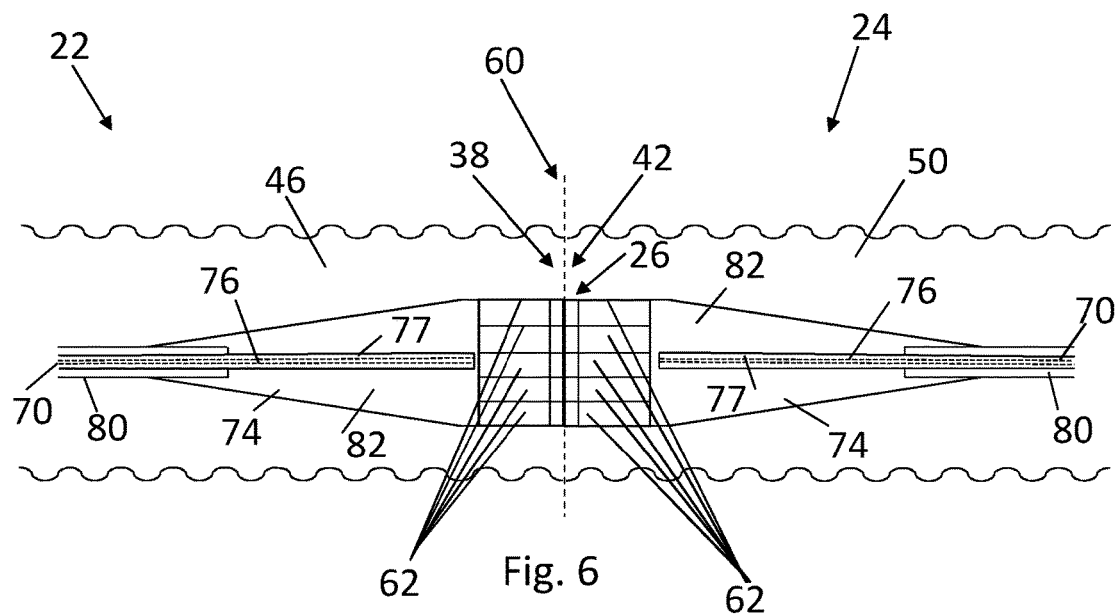

WIND TURBINE BLADE

FIELD OF THE INVENTION

The present invention relates to a wind turbine blade.

BACKGROUND OF THE INVENTION

It is known to construct wind turbine blades using separable spanwise blade portions, which are joined together in order to facilitate transport of large wind turbine blades. For example, applicant's co-pending PCT application no. PCT/DK2017/050441, which is incorporated herein by reference, describes such a 'split blade' for a wind turbine.

SUMMARY OF THE INVENTION

A first aspect of the invention provides a wind turbine blade comprising: a first wind turbine blade portion having an upper shell half and a lower shell half that defines a suction side, pressure side, leading edge, and a trailing edge of the blade, the first blade portion further including a first blade interface at one end of the first blade portion; a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces; a connection joint for coupling the first and second blade portions together; a first spar cap associated with the upper shell half and a second spar cap associated with the lower shell half of each of the first and second blade portions; and a shear web extending between the first spar cap and the second spar cap of each of the first and second blade portions, wherein the shear webs of the first and second blade portions are terminated away from the respective first and second blade interfaces, and there is no shear web between the first and second spar caps extending in a longitudinal direction across the first and second blade interfaces when the first blade portion and the second blade portion are coupled together by the connection joint.

The invention is advantageous in that the first and second blade portions can be coupled together without needing to also connect the shear webs across the joint. Time for assembly of the joint can be reduced, and personnel access to the interior of the blade may be limited to the vicinity of the blade shells or avoided altogether. The shear loads carried by the shear webs may be transferred into the spar caps away from the blade interfaces.

By having no shear web between the first and second spar caps extending in a longitudinal direction across the first and second blade interfaces means that the shear web is effectively interrupted across the connection joint. As such, there is no direct shear transfer between the shear web in the first blade portion and the shear web in the second blade portion.

The first and second spar caps may form part of a load bearing structure extending in the longitudinal direction that carries the flap-wise bending loads of the blade. The load bearing structure may be integrated into, or attached to, the upper and lower shell halves of the first and second blade portions. The load bearing structure of the first and second blade portions may have a cross section that increases toward the respective first and second blade interfaces.

The first and second spar caps may be integrated into the upper and lower shell halves of the first and/or second blade portion.

A width and/or thickness of the first and second spar caps may increase in the longitudinal direction toward the first and/or second blade interfaces of the first and/or second blade portions respectively.

A shell thickness of the upper and lower shell halves of the first and second blade portions may increase in the longitudinal direction toward the first and second blade interfaces of the first and second blade portions respectively.

As the thickness of the spar caps or the shell halves increase, the bending stiffness of the spar caps or the shell halves will increase. Due to this increased bending stiffness the stability of the blade portions is increased which can allow the shear web to be interrupted across the connection joint. In particular, the increased stiffness can prevent the blade from buckling at the connection joint where there is no direct web connection between the two blade portions.

The termination of the shear web may be concave. In particular, the termination of the shear web may have a curved scallop shape.

The shear web extending between the first spar cap and the second spar cap may be branched in the longitudinal direction toward the first and/or second blade interfaces of the first and/or second blade portions respectively.

The branched shear web extending between the first spar cap and the second spar cap may be divided into two or more discrete shear web portions.

At least some of the shear web portions may be overlapping in the longitudinal direction.

The connection joint may comprise a plurality of connecting elements integrated into the first and second blade portions at the first and second blade interfaces. The connecting elements may form part of the load bearing structure of the first and second blade portions. Where the connecting elements form part of the load bearing structure, the connecting elements may contribute to the increasing cross section of the load bearing structure of the first and second blade portions toward the respective first and second blade interfaces.

Each of the plurality of connecting elements may be wedge shaped.

At least some of the wedge shaped connecting elements may be transitioned into the first and second spar caps.

The first and second spar caps may each be associated with a respective group of the connecting elements. The group of connecting elements may be arranged chordwise and may have a group width. A width of the first and second spar caps may increase in the longitudinal direction toward the first and second blade interfaces of the first and second blade portions respectively. The width of the first and second spar caps adjacent the first and second blade interfaces may substantially equal the group width of the associated group of connecting elements.

The shear webs of the first and/or second blade portions may have their termination substantially coincident with a distal end of the connecting elements furthest from the respective first and second blade interfaces.

The connection joint may further comprise at least one tension member for coupling to the connecting elements to join the first wind turbine blade portion to the second wind turbine blade portion.

Each connecting element may have an eye that defines at least in part a bore that extends from an exterior to an interior of one of the first or second blade portions.

The connection joint may further comprise a plurality of cross pins configured to be inserted through respective eyes of the plurality of connecting elements which form the bores through the first and second blade portions. The cross pins may be received in the eyes. An exposed portion of the cross pins may be configured to extend away from at least one of an exterior surface and an interior surface of the first and second blade portions.

The first and second blade interfaces may include respective plates configured to abut when the first blade portion and the second blade portion are coupled together by the connection joint.

A further aspect of the invention provides a wind turbine, comprising: a tower; a nacelle positioned atop the tower; a rotor coupled to the nacelle and including at least one rotor blade including a first blade portion and a second blade portion coupled together by a connection joint, wherein the rotor blade has a shear web which is terminated away from a joint interface at which the first and second blade portions meet, and there is no shear web extending in a longitudinal direction across the joint interface. The invention may be combined with any of the features of the first aspect.

A second aspect of the invention provides a wind turbine blade comprising: a first wind turbine blade portion having an upper shell half and a lower shell half that defines a suction side, pressure side, leading edge, and a trailing edge of the blade, the first blade portion further including a first blade interface at one end of the first blade portion; a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces; a connection joint for coupling the first and second blade portions together; a first spar cap associated with the upper shell half and a second spar cap associated with the lower shell half of each of the first and second blade portions; and a shear web extending between the first spar cap and the second spar cap of each of the first and second blade portions, wherein the shear web extending between the first spar cap and the second spar cap is branched in the longitudinal direction toward the first and second blade interfaces of the first and second blade portions respectively.

The invention of the second aspect is advantageous in that the branched shear web can increase the stability or stiffness of the blade or blade shell. Increasing the stability of the blade or blade shell by way of the branched shear web may be particularly beneficial where the first and second spar caps have a greater width. The branched shear web may also reduce stress concentrations where the shear loads are transferred into the spar caps. The invention may be combined with any of the features of the first aspect. The branched shear web may be particularly beneficial where the shear webs of the first and second blade portions are terminated away from the respective first and second blade interfaces.

BRIEF DESCRIPTION OF THE DRAWINGS

Embodiments of the invention will now be described with reference to the accompanying drawings, in which:

FIG. 5 shows a schematic cross section view in the plane of the main shear web at the joint;
FIG. 6 shows a schematic top view of the main shear web at the joint.

DETAILED DESCRIPTION OF EMBODIMENT(S)

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the first and second spar caps may form part of the load bearing structure extending in the longitudinal direction that carries the flap-wise bending loads of the blade.

The term shear web is used to refer to a longitudinal, generally spanwise extending, reinforcing member of the blade that can transfer load from one of the windward and leeward sides of the blade to the other of the windward and leeward sides of the blade.

Figure 1:
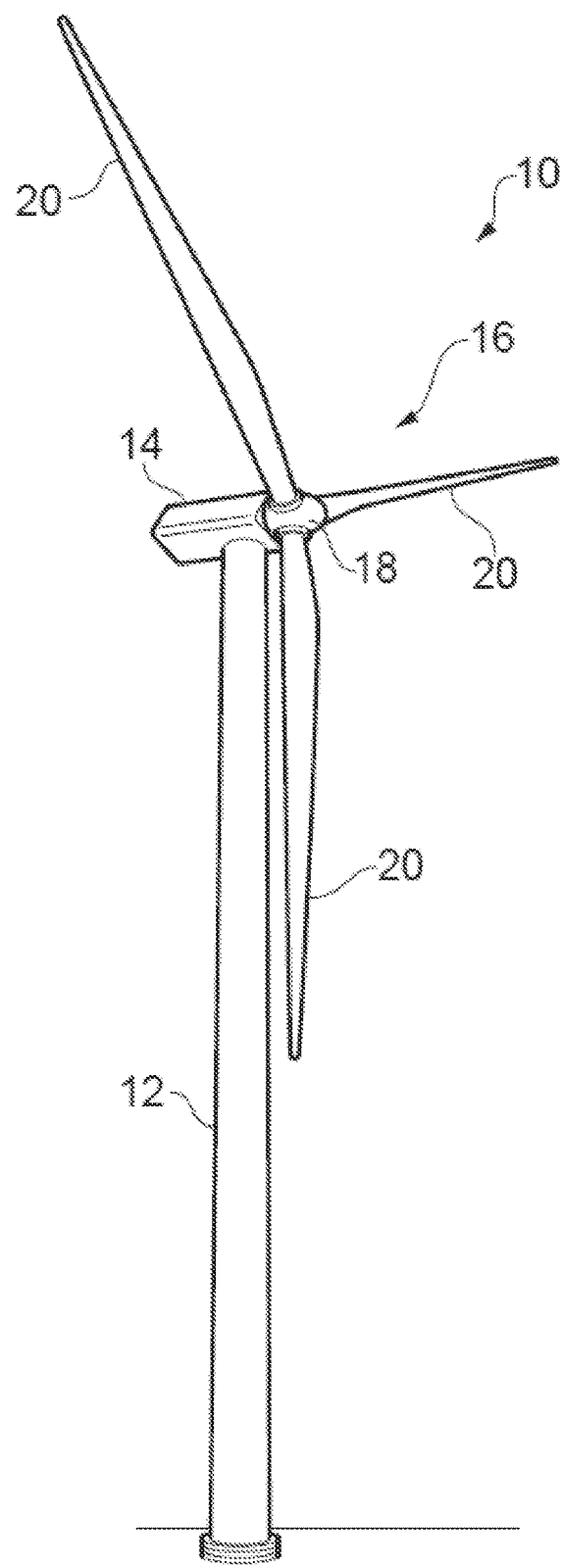
FIG. 1 shows a wind turbine.

FIG. 1 shows a wind turbine 10 including a tower 12 and a nacelle 14 disposed at the apex of the tower 12.

A rotor 16 is operatively coupled via a gearbox to a generator (not shown) housed inside the nacelle 14. The rotor 16 includes a central hub 18 and a plurality of rotor blades 20, which project outwardly from the central hub 18. While the embodiment shown in FIG. 1 has 3 blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
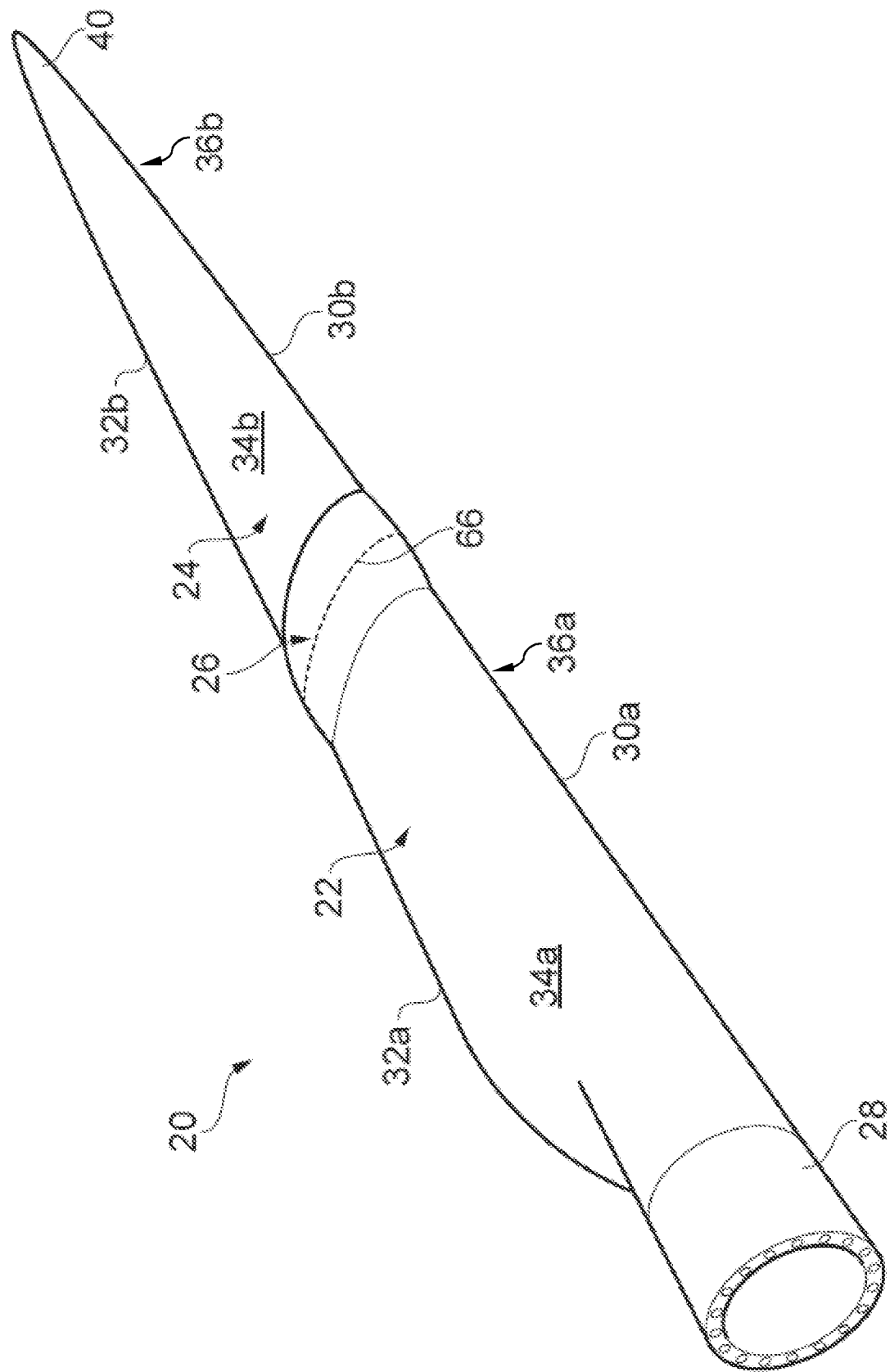
FIG. 2 shows a wind turbine blade comprising separable wind turbine blade portions.

FIG. 2 illustrates a split wind turbine blade 20 for use in such a wind turbine. The wind turbine blade 20 includes a first wind turbine blade portion 22 and a second wind turbine blade portion 24, which may be connected at a joint interface to form the blade 20.

As will be described below, each wind turbine blade portion 22, 24 may be manufactured separately and may each have all their electrical connections, e.g. for lightning strike and equipotential bonding, made at the time of manufacture. Each blade portion is then transported to a site for erection of the wind turbine. The blade portions are then joined together at the erection site to form the completed blade 20 before each blade is mounted to the hub 18 to form the rotor 16 of the wind turbine. Joining the blade portions 22, 24 together may create the required electrical connections between the blade portions.

The first blade portion 22 includes a root end 28, a leading edge 30a, a trailing edge 32a, a pressure side 34a and a suction side 36a. Similarly, the second blade portion 24 has a tip end 40, a leading edge 30b, a trailing edge 32b, a pressure side 34b and a suction side 36b. The two blade portions may be joined at a connection joint 26, which is covered by a fairing 66.

While the example shown in FIG. 2 has two blade portions, it will be understood that a blade may have three or more blade portions with a joint between adjacent blade portions.

While the first wind turbine blade portion 22 is showing as being nearer the root of the blade 20 and second wind turbine blade portion 24 is shown as being nearer the tip of the wind turbine blade 20, the labels "first" and "second" are not intended to be limiting and any specific property disclosed as being associated with the first or second wind turbine blade portion may be applied to the other wind turbine blade portion.

Figure 3:
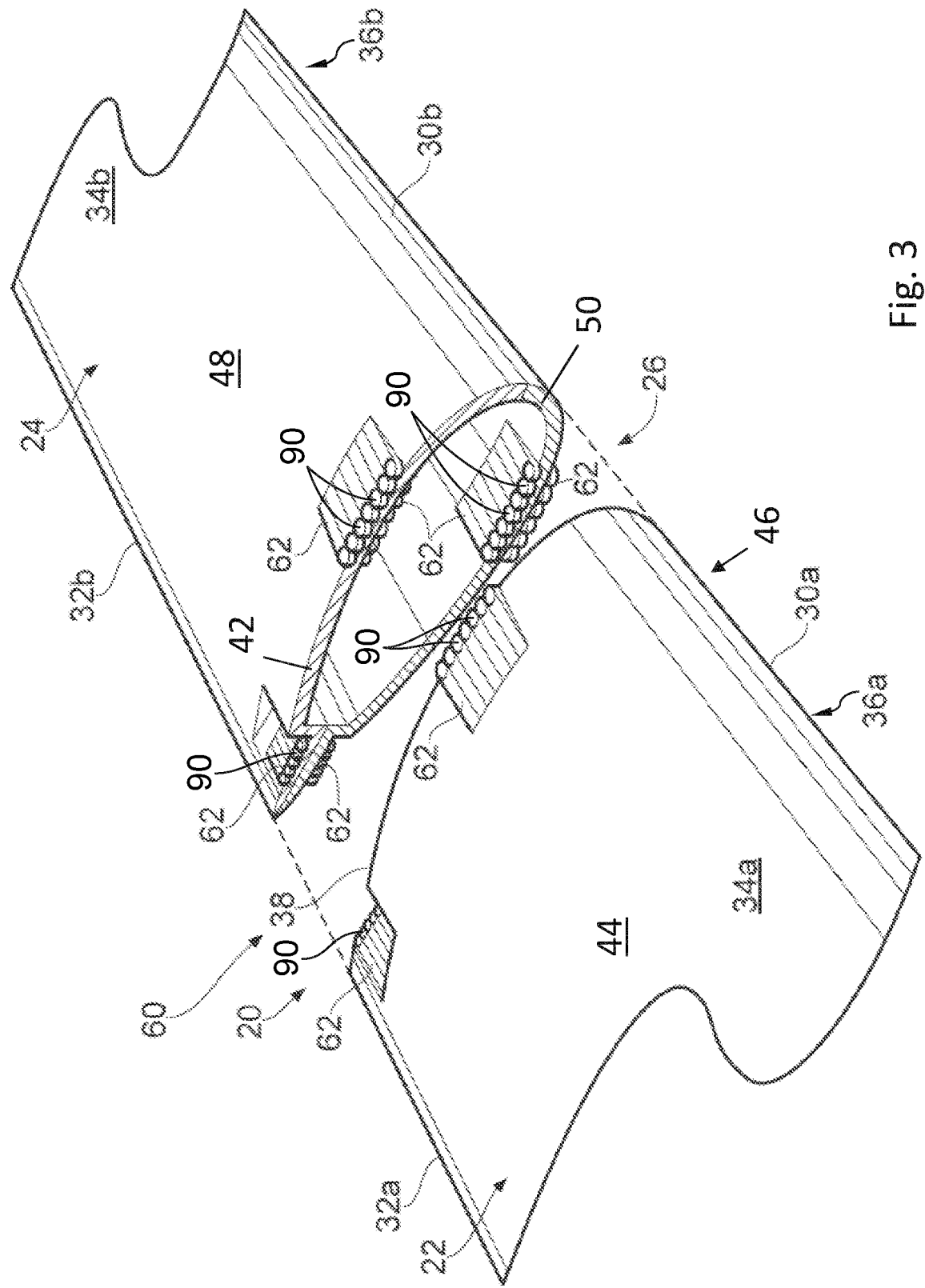
FIG. 3 shows a view of two adjacent wind turbine blade portions.

FIG. 3 shows the first and second wind turbine blade portions 22 and 24 separated at the location of the connection joint 26. In FIG. 3, it can be seen that the wind turbine blade portions 22, 24 may be formed from substantially hollow shells. The first blade portion 22 may have an upper shell half 44 and a lower shell half 46. The shell halves 44, 46 may define the pressure side 34a, suction side 36a, the leading edge 30a, and the trailing edge 32a of the first blade portion 22. Similarly, the second blade portion 24 may have an upper shell half 48 and a lower shell half 50. The shell halves 48, 50 may define the pressure side 34b, suction side 36b, the leading edge 30b, and the trailing edge 32b of the second blade portion 24.

The first blade portion 22 may have a first blade interface 38 at one end of the first blade portion, and the second blade portion 24 may have a second blade interface 42 at one end of the second blade portion 24. The first and second blade portions 22, 24 may be configured to be coupled together at the first and second blade interfaces 38, 42 by the connection joint 26 using attachments portions 62.

The blade 20 shown in FIG. 3 has opposing pairs of first and second connecting elements 62 disposed on the upper and lower shell halves 44, 46 and disposed in two discrete positions, one nearer to the leading edge 30a, 30b and one nearer to the trailing edge, 32a, 32b. The two positions of the connecting elements 62 may generally correspond to the location of reinforcing member(s), e.g. main spar and trailing edge spar or stringer, of the load bearing structure within the blade.

While the blade portions 22, 24 are each shown as being constructed as a shell formed of two shell halves, bonded together by an adhesive, it is also envisioned that each of the blade portions 22, 24 may be constructed from a single shell. Even as a single shell the top (upper) and bottom (lower) sides of the shell will be referred to as the shell halves.

Figure 4:
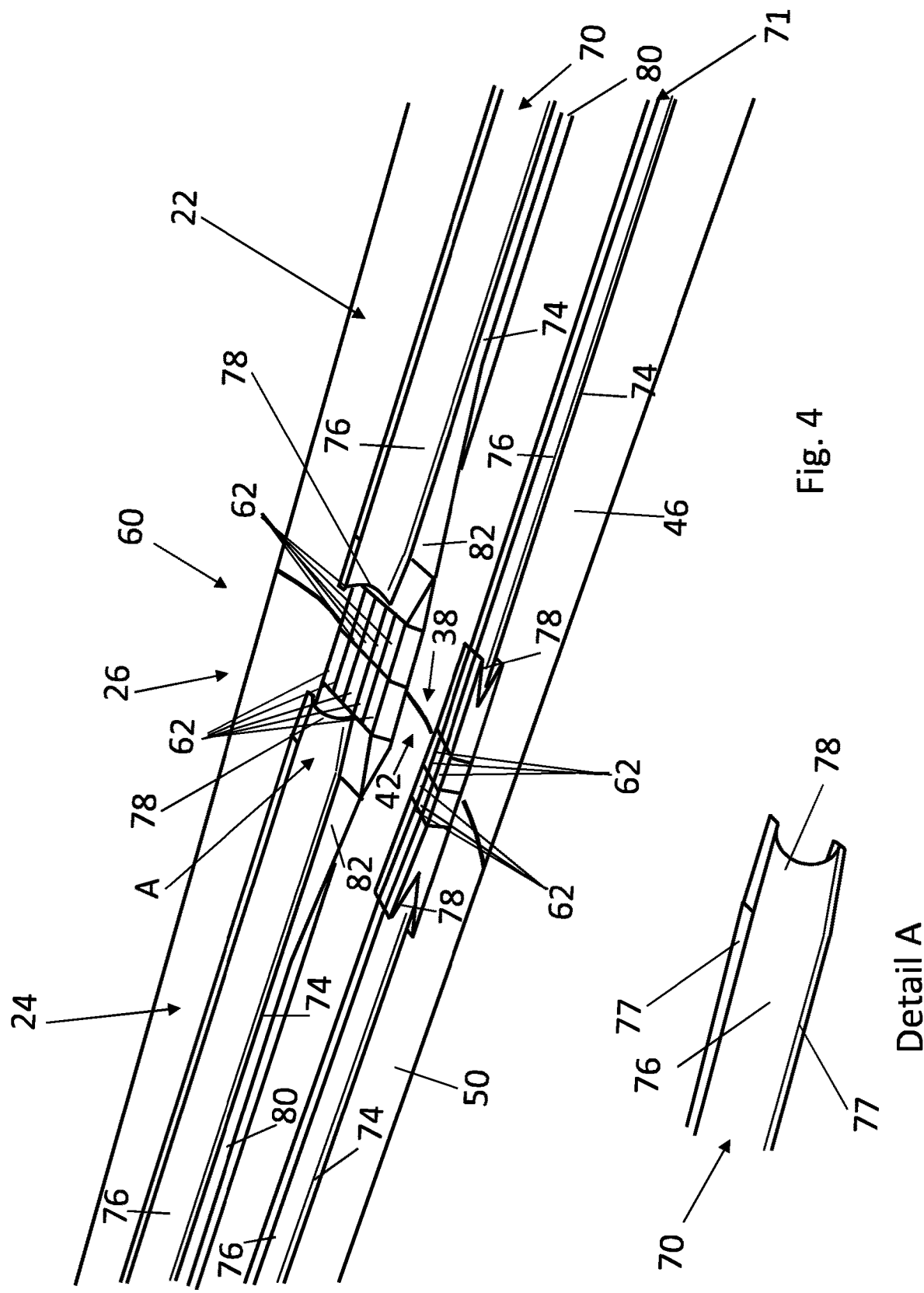
FIG. 4 shows a schematic view of the interior of the blade (with one blade shell half removed for clarity) at the joint between two blade portions, showing the main and trailing edge shear webs terminating away from the joint.

The blade portions 22, 24 may each comprise a load bearing structure. In the example of FIG. 4, each blade portion has a first reinforcing member in the form of a main spar 70 and a second reinforcing member in the form of a trailing edge spar 71. In other examples, there may be a single reinforcing member in each blade portion. As shown in FIG. 4, the reinforcing member may include a spar cap, associated with each of the upper and lower shell halves of each blade portion, and a shear web extending between the spar caps. In FIG. 4 the upper shell halves 44, 48 have been removed for clarity and in combination with FIG. 5 it can be seen that the main spar 70 has a first spar cap 72 associated with the upper shell half 44, 48 of the first and second blade portions 22, 24, respectively, and a second spar cap 74 associated with the lower shell half 46, 50 of each of the first and second blade portions 22, 24.

A shear web 76 extends between the first spar cap 72 and the second spar cap 74 of each of the first and second blade portions 22, 24. The shear webs 76 of the first and second blade portions 22, 24 have a termination 78, which is away from the respective first and second blade interfaces 38, 42. As can be seen in FIGS. 4 and 5, there is no shear web between the first and second spar caps 72, 74 which extends in a longitudinal direction across the first and second blade interfaces 38, 42, when the first blade portion 22 and the second blade portion 24 are coupled together by the connection joint 26. As the shear webs 76 approach the joint 60 the shear load is phased out of the shear web 76 and transferred into the spar caps 72, 74. The coupling of the first and second blade portions 22, 24 may then be by the connection joint 26 between the blade shells alone without having to separately connect the shear webs 76 across the joint 60. This simplifies access and time and therefore cost to couple the first and second blade portions 22, 24.

The first and second spar caps 72, 74 may be integrated into the respective upper and lower shell halves 44, 48, 46, 50 of the first and second blade portions 22, 24. Alternatively the spar caps may be attached to an interior surface of the upper and lower shell halves. Further alternatively some of the spar caps may be integrated into the shell halves and some of the spar caps may be attached to an interior surface of the shell halves.

The spar caps may include pre-cured, solid pultrusion strips for reinforcement or strengthening purposes. These pultrusions are often long, flat strips of carbon filament embedded in pure resin matrix. Pultrusions may extend along a significant portion of blade spanwise extent. Pultrusions may extend for a substantial length of the first and second blade portions 22, 24. The flat pultruded strips are typically laid up in longitudinal stacks during moulding of the blade portions, as discussed below. In an alternative example, the spar caps may be formed from pultrusions or be formed from fibres and resin materials generally known in the art.

As illustrated in FIG. 6, the connection joint 26 between the first and second blade portions 22, 24 of the blade 20 at the first and second blade interfaces 38, 42 includes a plurality of connecting elements 62 integrated into the blade portions 22, 24, adjacent their respective blade interfaces 38, 42. More particularly, the connecting element 62 may be integrated into the spar caps 72, 74 at their respective blade interfaces 38, 42. The connecting elements 62 may be distributed along a width of the spar caps 72, 74 (e.g. in a chordwise direction of the blade) and may be substantially embedded within the material that forms the spar caps 72, 74.

The spar caps 72, 74 may form part of the load bearing structure extending in the longitudinal direction that carries the flap-wise bending loads of the blade 20. The load bearing structure of the first and second blade portions 22, 24 may have a cross section that increases toward the respective first and second blade interfaces 38, 42. A thickness dimension of the ends of the spar caps 72, 74 may be gradually tapered down towards the joint 60 between respective blade portions. In this way, respective connecting elements 62 may be overlaid on tapered end portions of a spar cap 72, 74. The connecting elements 62 may therefore also form part of the load bearing structure such that the connecting elements 62 may contribute to the increasing cross section of the load bearing structure of the first and second blade portions 22, 24 toward the respective first and second blade interfaces 38, 42. Still further, a width dimension of the spar cap 72, 74 may be gradually tapered outwards towards the joint 60 between respective blade portions. In this way, respective connecting elements 62 may be overlaid on widened end portions of the spar cap 72, 74.

As best shown in FIG. 6, at some distance away from the blade interfaces 38, 42, the spar cap 74 includes a stack of pultruded carbon strips 80 of substantially constant width. The height of the stack 80 may vary along the length of the blade 20 according to the local load but the stack width may remain substantially constant along the length of the blade. The stack 80 is transitioned into a slab portion 82 of the spar cap 74. The slab 82 forms part of the longitudinal load bearing structure of the blade. The slab 82 may include carbon or glass fibre reinforced material, e.g. in the form of carbon or glass pre-preg or infused carbon or glass fabric.

The slab 82 may be interleaved with the pultruded carbon stack 80 so as to transition from the stack 80 into the slab 82. The width of the slab 82 may be substantially the same as that of the width of the stack 80 at the start of the transition furthest from the blade interfaces 38, 42. The strips of pultruded carbon in the stack 80 may be interleaved so as to form a scarf joint at the transition with the slab 82. It can therefore be seen that the pultruded carbon stack 80 terminates further away from the blade interfaces 38, 42 than does the termination 78 of the shear web 76. The slab 82 has a width which tapers outwardly towards the first and second blade interfaces 38, 42. The width of the slab 82 is increased up to approximately the same width as the group of connecting elements 62.

The connecting elements 62 may comprise generally wedge shaped members. The connecting element 62 may include carbon or glass fibre reinforced plastic material for example. The wedge shaped connecting elements 62 may be interleaved with the end of the slab 82 nearest the blade interfaces 38, 42. Alternatively, the wedge shaped connecting element 62 may be laid on top of the slab 82 and bonded or co-cured with the slab 82. The connecting elements 62 are used to clamp together the first and second blade portions 22, 24 by bringing the first and second blade interfaces 38, 42 into compression. Loads in the connecting elements 62 are transferred into the slab 82 and into the stack 80 of the first and second spar caps 72, 74. Progressing along the longitudinal direction of the blade 20 towards the first or second blade interfaces 38, 42, the thickness of the upper and lower shell halves 44, 48, 46, 50 may increase. That is to say, the thickness, or height of the stack 80 of pultruded carbon is transitioned into the slab 82 which has an increasing thickness towards the connecting elements 62, before decreasing in thickness under the connecting elements 62, and the connecting elements 62 are generally wedge shaped such that the shell reaches a greater thickness adjacent the first and second blade interfaces 38, 42.

As best shown in FIGS. 4 and 5, the termination 78 of the shear web 76 may be concave. In other words, the termination 78 has a profile when viewed normal to the plane of the web which is cut back away from the respective first and second blade interfaces 38, 42. The concave termination 78 has a smooth curvature to avoid stress concentrations. Such curvature may have a constant radius, elliptical or other geometrical shape. The shear web 76 has upper and lower flanges 77 by means of which the shear web 76 is attached, e.g. by co-curing or adhesive bonding to the first and second spar caps 72, 74. The height of the shear web 76 may reduce towards the termination 78 to accommodate the reduced height between the first and second spar caps 72, 74 whose thickness increases towards the first and second blade interfaces 38, 42.

The trailing edge spar 71 may have a similar arrangement to the main spar 70. All features and variants described above with reference to the main spar 70 may apply equally or similarly to the trailing edge spar 71.

Of course, it will be apparent that the blade 20 may have only a single spar, two spars, or more than two spars, or the connecting elements 62 may be positioned away from the spar locations. Instead of the trailing edge spar, a trailing edge stringer may instead be provided. The trailing edge stringers may be incorporated into the blade portions so as to form part of the outer shell of the blade portions 22, 24. The trailing edge stringers may be formed from pre-cured, solid pultrusion strips for reinforcement or strengthening purposes in similar material and construction to the spar caps described above. The main difference between a stringer and a spar is that the stringer does not have a shear web extending between the shell halves through the hollow interior of the blade. It should be recognised that in alternative examples, the trailing edge stringers may not form part of the outer shell of the blade portions, but may engage with an inner surface of the outer shell.

The connecting elements 62 shown in FIG. 3 may be formed as a plurality of composite loops attached to the blade shell, having apertures, such as, eyes 90 therethrough in a thickness direction of the blade 20. However, the connecting elements 62 could alternatively have other shapes and be made of other materials for providing anchoring of the tension members 64 to the blade portions 22, 24. The connecting elements 62 may be embedded in the blade shells 44, 46, 48, 50. Eyes 90 through the connecting elements 62 may extend through the blade shells 44, 46, 48, 50.

Figure 7:
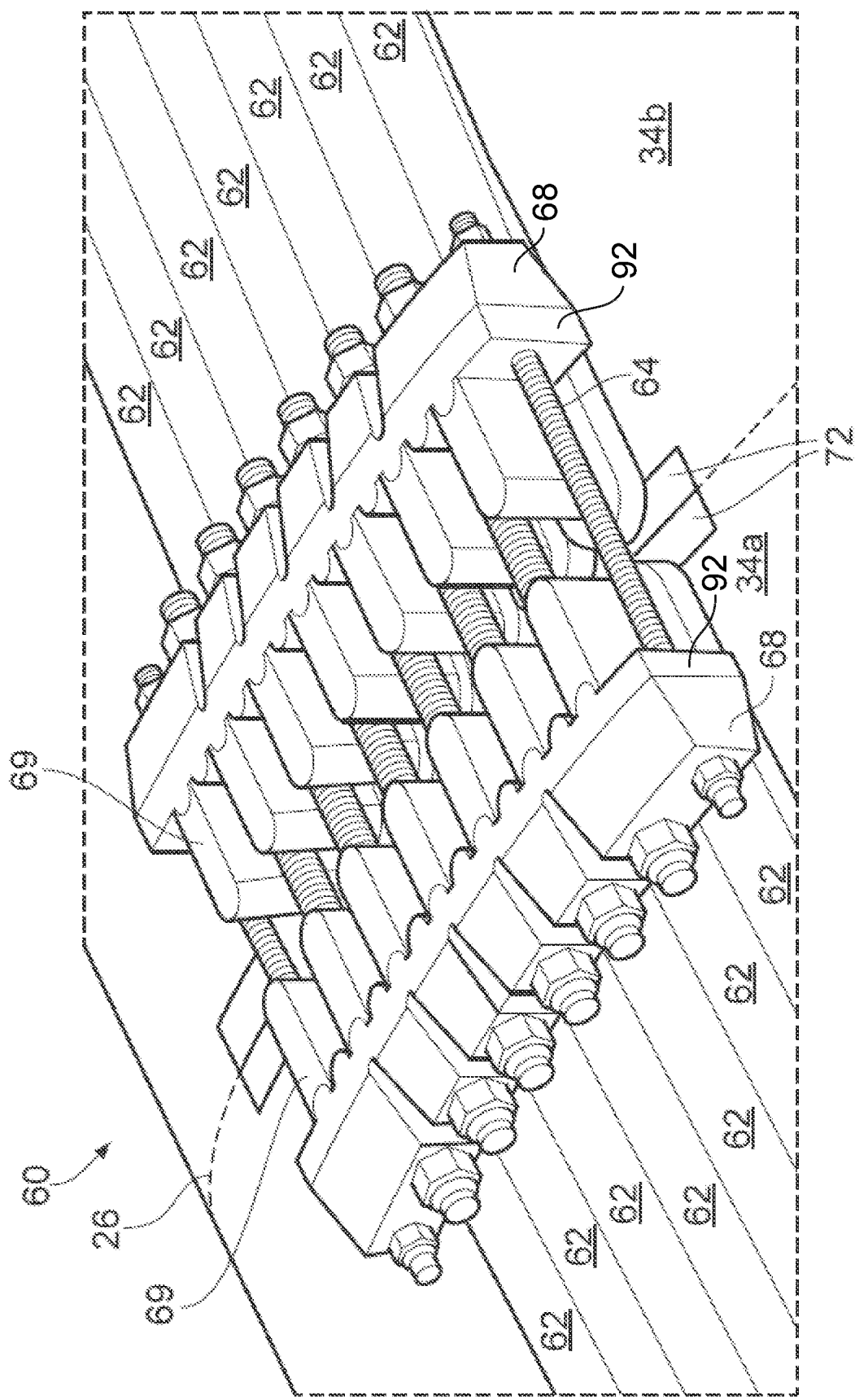
FIG. 7 shows a view from above of a joint between two adjacent wind turbine blade portions.

FIG. 7 shows a view from above of the joint 60 once the blade portions 22 and 24 have been joined together. While FIG. 4 shows the joint at one region or array of the connecting elements 62, it will be understood that a similar arrangement may be used at all or any other connecting elements of the blade.

As can be seen from FIG. 7, the joint 60 comprises retention blocks 68 and connection members in the form of cross pins 69. The cross pins extend through eyes 90 in the connecting elements 62 and the retention blocks 68 act against the cross pins 69. Plates 92 may be coupled to the retention blocks 68. The plates 92 are configured to abut when the first blade portion 22 and the second blade portion 24 are coupled together by the connection joint 26. This type of joint is described in applicant's co-pending application PCT/DK2017/050441 which is incorporated herein by reference and so will not be discussed in detail. However, in brief, the retention blocks 68 have holes through which the tension members 64 may pass. The tension members 64 may be bolts or pins. The bolts or pins may be threaded and secured against the retention blocks 68 by nuts. When the tension members 64 are put under tension, the retention blocks 68 act against the cross pins 69 such that the blade portions 22 and 24 are connected together at the joint.

It is also envisioned that this arrangement may be mirrored on the other side of the joint 60, such that there are tension members 64 on both the interior and the exterior of the blade portions 22, 24. This arrangement may also be repeated at the trailing edge connecting elements 62, although there the cross pins 69 may extend from one side of the blade 20 through to the other side of the blade 20, since the eyes 90 in the connecting elements 62 at the trailing edge 32*a*, 32*b* do not open into the interior of the blade 20 but instead pass through from one side of the blade 20 to the other side.

It is also envisioned that the joint 60 may comprise a generally U-shaped clamp having a base and legs extending from the base which pass through the apertures of the connecting elements 62, and with a tension member (e.g. a bolt or pin) joining the free ends of the legs of the U-shaped clamp. Tensioning the tension member imparts a corresponding tension in the base of the U-shaped clamp. The base of the U-shaped clamp may therefore also be considered as a tension member. Such a joint configuration and others which may be used for joining blade portions is known from applicant's co-pending application PCT/DK2017/050441 which is incorporated herein by reference.

Regardless of the specific type of connecting elements and connecting members, the tension members 64 may extend across the blade joint 60, and be coupled to connecting members 68 at both ends to anchor the tension members to the blade portions.

The connecting elements may alternatively be arranged as a plurality of threaded bushings formed in the spar caps. The spar caps of the first and second blade portions may have an increasing dimension (increasing width and/or thickness) toward the first and second blade interfaces. Threaded bushings may be formed, e.g. in a row or rows, in the ends of the spar caps at the first and second blade interfaces. An axially extended threaded rod may be used to connect respective pairs of the threaded bushings to join the first and second blade portions together.

The shear web 76 (of the main spar 70 or the trailing edge spar 71) may be branched in the longitudinal direction towards the first and/or second blade interfaces 38, 42 of the first and/or second blade portions 22, 24 respectively. By branched it is meant that the shear web splits or is divided into two or more discrete shear web portions 73 towards the termination 78. The branched shear web can increase the stability or stiffness of the blade or blade shell.

Figure 8:
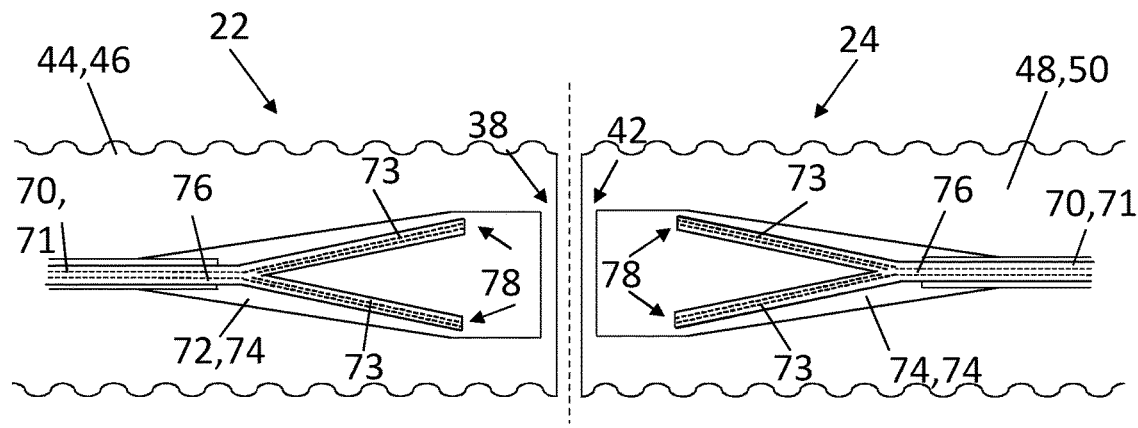
FIG. 8 shows a schematic top view of first example of a branched shear web.

A first example of a branched shear web is shown in FIG. 8 in which like reference numerals have been used to denote like parts with the preceding examples. As previously, the spar cap 72, 74 has a width which tapers outwardly towards the first and second blade interfaces 38, 42. Turning back to the examples shown in FIGS. 6 and 8, it can be seen that as the width of the spar cap 72, 74 increases, the distance between the lateral edge of the spar cap and the centre line of the shear web 76 increases towards the first and second blade interfaces 38, 42. Depending on the dimensions of the blade 20 and the maximum width of the spar caps 72, 74 this distance may lead to instability or insufficient stiffness of the blade 20 or the blade shell if the shear web 76 is not branched.

By branching the shear web 76 into two or more discrete shear web portions 73, as shown in FIG. 8, the distance between the lateral edge of the spar cap 72, 74 and the centre line of the shear web portions 73 is much reduced so that the branched shear web can increase the stability or stiffness of the blade or blade shell. In the example shown in FIG. 8, the branched shear web forms a generally Y-shaped or bifurcated shear web in which the two shear web portions 73 split from a fork and diverge outwardly (i.e. in the blade chordwise direction) towards the respective first and second blade interfaces 38, 42.

Figure 9:
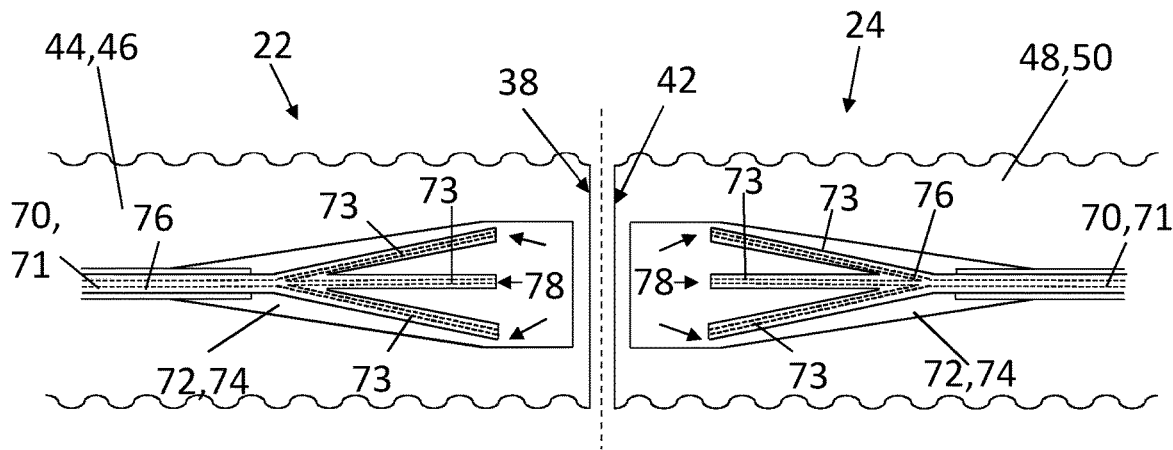
FIG. 9 shows a schematic top view of second example of a branched shear web.

FIG. 9 shows this second example of a branched shear web which shares many similarities to the first example of FIG. 8 and so like reference numerals have been used to denote like or similar parts. The main difference between the example in FIG. 9 and the example in FIG. 8 is that the shear web is divided into three discrete shear web portions 73 to form a trifurcated shear web, where each of the three discrete shear web portions diverge from a common fork.

Figure 10:
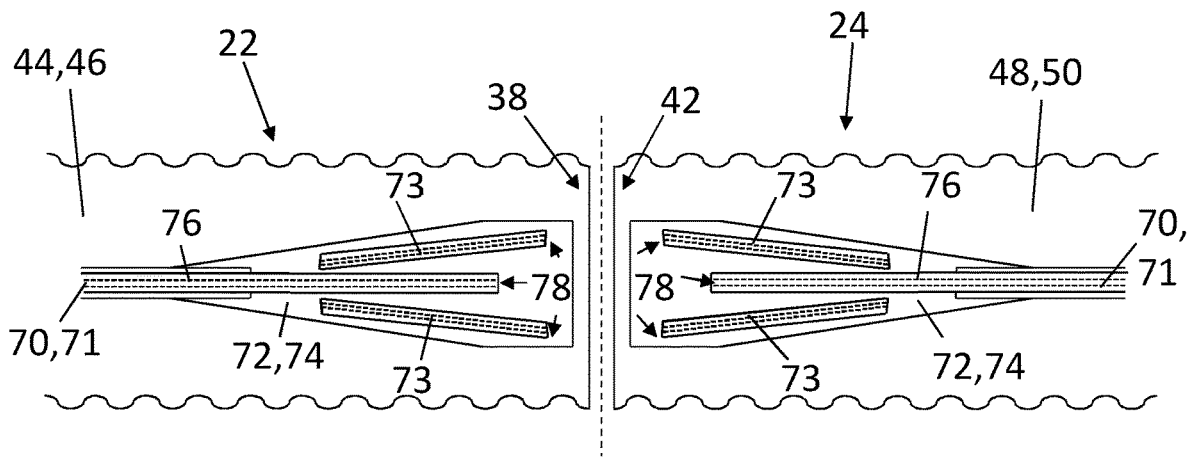
FIG. 10 shows a schematic top view of third example of a branched shear web.

FIG. 10 shows a third example of a branched shear web which again shares many similarities with the first and second examples of FIGS. 8 and 9 and so like reference numerals have been used to denote like or similar parts. The main difference in the third example is that the branched shear web is divided to form a main web and two or more side webs so as to form the discrete shear web portions 73. The side webs are not directly connected to the main web and are connected via the spar caps 72, 74. The side webs may overlap with the main web in the longitudinal direction, or alternatively the side webs may commence where the main web terminates such that the side webs and the main web do not substantially overlap in the longitudinal direction. The side webs may be orientated so as to diverge away from one another and away from the main web in the longitudinal direction towards the first and second blade interfaces 38, 42. The main web may be terminated further from the first and second blade interfaces 38, 42 as compared with the examples shown in FIGS. 6 and 8. In a further example, the side webs may be oriented substantially parallel with the main web.

The branched shear web configurations described above with reference to FIGS. 8 to 9, or any of the various alternatives described, may be adopted in any of the examples described above with reference to FIGS. 3 to 7. In particular, the branched shear webs may be used advantageously in the main spar 70 described with reference to FIGS. 4 to 6. Additionally, or alternatively, the branched shear webs may be used advantageously in the trailing edge spar 71 described with reference to FIGS. 4, 7 and 8, e.g. where the discrete shear web portions 73 may each be scarfed into the connecting element 62.

The termination 78 of the shear web 76 and/or the shear web portions 73 in the various examples of the branched shear web described above may have a concave termination 78 similar to that described above with reference to FIG. 5. Alternatively, the termination may be substantially linear and aligned with the thickness direction of the blade. Yet further alternatively, the termination 78 may taper to a point so that it may be scarfed into the connecting element 62 in the manner described above with reference to FIG. 7.

Whilst the shear web 76 and/or the discrete shear web portions 73 of the branched shear web may be terminated away from the respective first and second blade interfaces 38, 42 such that there is no shear web between the first and second spar caps 72, 74 extending in a longitudinal direction across the first and second blade interfaces 38, 42 when the first blade portion 22 and the second blade portion 24 are coupled together by the connection joint 26, in an alternative configuration the discrete shear web portions 73 of the branched shear web may extend up to or across the first and second blade interfaces 38, 42 such that there is a shear web between the first and second spar caps extending in a longitudinal direction across the first and second blade interfaces when the first blade portion and the second blade portion are coupled together by the connection joint. Where the shear web or shear web portions extend across the blade interfaces, then the shear web or shear web portions may overlap such that they may be joined together in the vicinity of the joint 60.

A removable inspection hatch may be provided in the blade outer surface covering the tension members to permit access to the tension members.

Where the blade comprises two blade portions, the joint may be provided approximately in the mid span portion of the blade or may be provided nearer the root end or nearer the tip end of the blade. Where the blade comprises three or more blade portions the joints may be provided spaced approximately equidistantly or otherwise along the spanwise direction.

Although the invention has been described above with reference to one or more preferred embodiments, it will be appreciated that various changes or modifications may be made without departing from the scope of the invention as defined in the appended claims.

The invention claimed is:

1. A wind turbine blade comprising:
   a first wind turbine blade portion having an upper shell half and a lower shell half that defines a suction side, pressure side, leading edge, and a trailing edge of the blade, the first blade portion further including a first blade interface at one end of the first blade portion;
   a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces;
   a connection joint for coupling the first and second blade portions together;
   a first spar cap associated with the upper shell half and a second spar cap associated with the lower shell half of each of the first and second blade portions; and
   a shear web extending between the first spar cap and the second spar cap of each of the first and second blade portions,
   wherein there is no shear web extending in a longitudinal direction across the first and second blade interfaces when the first blade portion and the second blade portion are coupled together by the connection joint, and
   wherein the shear webs of the first and second blade portions are terminated away from the respective first and second blade interfaces to define a termination end of each shear web, and
   wherein the first spar cap and the second spar cap extend longitudinally beyond the termination end of the shear web in the first blade portion and the termination end of the shear web in the second blade portion.

2. The wind turbine blade according to claim 1, wherein the first and second spar caps are integrated into the upper and lower shell halves of the first and/or second blade portion.

3. The wind turbine blade according to claim 1, wherein a width and/or thickness of the first and second spar caps increases in the longitudinal direction toward the first and/or second blade interfaces of the first and/or second blade portions respectively.

4. The wind turbine blade according to claim 1, wherein a shell thickness of the upper and lower shell halves of the first and second blade portions increases in the longitudinal direction toward the first and second blade interfaces of the first and second blade portions respectively.

5. The wind turbine blade according to claim 1, wherein the termination of the shear web is concave.

6. The wind turbine blade according to claim 1, wherein the connection joint comprises a plurality of connecting elements integrated into the first and second blade portions at the first and second blade interfaces.

7. The wind turbine blade according to claim 6, wherein each of the plurality of connecting elements is wedge shaped.

8. The wind turbine blade according to claim 7, wherein at least some of the wedge shaped connecting elements are transitioned into the first and second spar caps.

9. The wind turbine blade according to claim 6, wherein the first and second spar caps are each associated with a respective group of the connecting elements, wherein the group of connecting elements are arranged chordwise and have a group width, wherein a width of the first and second spar caps increases in the longitudinal direction toward the first and second blade interfaces of the first and second blade portions respectively, and wherein the width of the first and second spar caps adjacent the first and second blade interfaces equals the group width of the associated group of connecting elements.

10. The wind turbine blade according to claim 6, wherein the shear webs of the first and/or second blade portions have their termination coincident with a distal end of the connecting elements furthest from the respective first and second blade interfaces.

11. The wind turbine blade according to claim 6, wherein the connection joint further comprises at least one tension member for coupling to the connecting elements to join the first wind turbine blade portion to the second wind turbine blade portion.

12. The wind turbine blade according to claim 6, wherein each connecting element has an eye that defines at least in part a bore that extends from an exterior to an interior of one of the first or second blade portions.

13. The wind turbine blade according to claim 11, wherein the connection joint further comprises a plurality of cross pins configured to be inserted through respective eyes of the plurality of connecting elements which form the bores through the first and second blade portions, wherein when the cross pins are received in the eyes, an exposed portion of the cross pins is configured to extend away from at least one of an exterior surface and an interior surface of the first and second blade portions.

14. The wind turbine blade according to claim 1, wherein the first and second blade interfaces include respective plates configured to abut when the first blade portion and the second blade portion are coupled together by the connection joint.

15. A wind turbine blade comprising:
  a first wind turbine blade portion having an upper shell half and a lower shell half that defines a suction side, pressure side, leading edge, and a trailing edge of the blade, the first blade portion further including a first blade interface at one end of the first blade portion;
  a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces;
  a connection joint for coupling the first and second blade portions together;
  a first spar cap associated with the upper shell half and a second spar cap associated with the lower shell half of each of the first and second blade portions; and
  a shear web extending between the first spar cap and the second spar cap of each of the first and second blade portions,
  wherein the shear webs of the first and second blade portions are terminated away from the respective first and second blade interfaces, and there is no shear web between the first and second spar caps extending in a longitudinal direction across the first and second blade interfaces when the first blade portion and the second blade portion are coupled together by the connection joint, and
  wherein the shear web extending between the first spar cap and the second spar cap is branched in the longitudinal direction toward the first and second blade interfaces of the first and second blade portions respectively.

16. The wind turbine blade according to claim 15, wherein the branched shear web extending between the first spar cap and the second spar cap is divided into two or more discrete shear web portions.

17. The wind turbine blade according to claim 16, wherein at least some of the shear web portions are overlapping in the longitudinal direction.

18. A wind turbine comprising:
  a tower;
  a nacelle positioned atop the tower;
  a rotor coupled to the nacelle and including at least one wind turbine blade including:
    a first wind turbine blade portion having an upper shell half and a lower shell half that defines a suction side, pressure side, leading edge, and a trailing edge of the blade, the first blade portion further including a first blade interface at one end of the first blade portion;
    a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces;
    a connection joint for coupling the first and second blade portions together;
    a first spar cap associated with the upper shell half and a second spar cap associated with the lower shell half of each of the first and second blade portions; and
    a shear web extending between the first spar cap and the second spar cap of each of the first and second blade portions,
  wherein there is no shear web extending in a longitudinal direction across the first and second blade interfaces when the first blade portion and the second blade portion are coupled together by the connection joint, and
  wherein the shear webs of the first and second blade portions are terminated away from the respective first and second blade interfaces to define a termination end of each shear web, and
  wherein the first spar cap and the second spar cap extend longitudinally beyond the termination end of the shear web in the first blade portion and the termination end of the shear web in the second blade portion.

19. A wind turbine blade comprising:
  a first wind turbine blade portion having an upper shell half and a lower shell half that defines a suction side, pressure side, leading edge, and a trailing edge of the blade, the first blade portion further including a first blade interface at one end of the first blade portion;
  a second blade portion having an upper shell half and a lower shell half that defines a suction side, pressure side, leading edge, and a trailing edge of the blade, the second blade portion further including a second blade interface at one end of the second blade portion, wherein the first blade portion and the second blade portion are configured to be coupled together at the first and second blade interfaces;
  a connection joint for coupling the first and second blade portions together;
  a first spar cap associated with the upper shell half and a second spar cap associated with the lower shell half of each of the first and second blade portions; and
  a shear web extending between the first spar cap and the second spar cap of each of the first and second blade portions,
  wherein there is no shear web extending in a longitudinal direction across the first and second blade interfaces when the first blade portion and the second blade portion are coupled together by the connection joint,
  wherein the shear webs of the first and second blade portions are terminated away from the respective first and second blade interfaces to define a termination end of each shear web, and wherein a longitudinal centerline is defined between the termination end of the shear web in the first blade portion and the termination end of the shear web in the second blade portion and that longitudinal centerline does not intersect any structure between the termination ends.

* * * * *